US006947739B2

(12) United States Patent
Yokoyama

(10) Patent No.: US 6,947,739 B2
(45) Date of Patent: Sep. 20, 2005

(54) SUBSCRIBER WIRELESS ACCESS SYSTEM

(75) Inventor: Naoki Yokoyama, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 386 days.

(21) Appl. No.: 10/026,544

(22) Filed: Dec. 27, 2001

(65) Prior Publication Data

US 2002/0086705 A1 Jul. 4, 2002

(30) Foreign Application Priority Data

Dec. 28, 2000 (JP) ......................................... 2000-400119

(51) Int. Cl.⁷ .......................... H04Q 7/20; H04M 1/00; H04L 12/66; H04L 12/28
(52) U.S. Cl. ................. 455/426.2; 455/560; 455/554.2; 455/561; 370/399; 370/395.31; 370/338; 370/353; 370/355; 370/356; 370/466; 370/310.2
(58) Field of Search ................................ 455/445, 560, 455/517, 518, 519, 426.2, 554.2, 426.1, 561; 370/389, 392, 397, 399, 395.2, 395.3, 395.31, 328, 329, 338, 352, 353, 354, 355, 356, 401, 410, 466, 310.1, 310.2; 709/238, 243, 244, 250

(56) References Cited

U.S. PATENT DOCUMENTS

| | | | | |
|---|---|---|---|---|
| 5,809,501 A | * | 9/1998 | Noven ............................ | 707/7 |
| 5,875,185 A | * | 2/1999 | Wang et al. ................. | 370/331 |
| 5,940,371 A | * | 8/1999 | Mitts et al. ................... | 370/236 |
| 5,958,018 A | * | 9/1999 | Eng et al. .................... | 709/246 |
| 5,974,036 A | * | 10/1999 | Acharya et al. ............ | 370/331 |
| 6,041,358 A | * | 3/2000 | Huang et al. ................ | 709/238 |
| 6,373,834 B1 | * | 4/2002 | Lundh et al. ................ | 370/350 |
| 6,473,411 B1 | * | 10/2002 | Kumaki et al. ............. | 370/331 |
| 6,606,310 B1 | * | 8/2003 | Vialen et al. ................ | 370/338 |
| 6,738,812 B1 | * | 5/2004 | Hara et al. ................... | 709/224 |
| 6,768,724 B1 | * | 7/2004 | Olkkonen ................ | 370/310.1 |
| 2002/0034962 A1 | * | 3/2002 | Yokoyama ................... | 455/519 |
| 2002/0086705 A1 | * | 7/2002 | Yokoyama ................... | 455/560 |
| 2002/0191562 A1 | * | 12/2002 | Kumaki et al. ............. | 370/331 |

FOREIGN PATENT DOCUMENTS

| | | | | |
|---|---|---|---|---|
| JP | 2003-78548 | * | 3/2003 | ........... H04L/12/56 |
| JP | 2003-333635 | * | 11/2003 | ............. H04Q/7/20 |

* cited by examiner

Primary Examiner—Rafael Perez-Gutierrez
(74) Attorney, Agent, or Firm—Wenderoth, Lind & Ponack, L.L.P.

(57) ABSTRACT

A subscriber wireless access system equipped with customer stations wirelessly connected to base stations and accommodating communication terminal devices in the customer stations. The system is provided with at least one exchange for connecting the base stations with a virtual dedicated line network for enabling customer stations wirelessly connected to different base stations to be interconnected via a virtual dedicated line network. The exchange includes table information assigned to the customer stations with virtual network connection information allocated for connected the customer stations, means responsive to receipt of data from a customer station via a subordinate base station for, with reference to the table, sending the data through the virtual network to another base station, and means responsive to receipt of data through the virtual network for, with reference to the table, converting the data to customer station identification information and sending the data to a subordinate base station.

16 Claims, 3 Drawing Sheets

SUBSCRIBER WIRELESS ACCESS SYSTEM

FIELD OF THE INVENTION

The present invention relates to a subscriber wireless access system for accommodating, in a customer station which is wirelessly connected to a base station, personal computers and other such communications terminal devices, or a LAN connected to such communication terminal devices. (A subscriber wireless access system of this type is also called, for example, a fixed wireless access (FWA) system.) More particularly, the present invention relates to a technology for controlling communications through a virtual dedicated line network which is implemented by an ATM (asynchronous transfer mode) network or the like.

DESCRIPTION OF THE PRIOR ART

Personal computers, mobile tools, mobile telephones and various other kinds of communication terminal equipment have recently become common items of everyday use. Wireless LANs for wirelessly interconnecting such communications terminal devices have been developed and put into operation.

Subscriber wireless access systems which accommodate customer station communication terminal devices, or a LAN or the like that is connected to communication terminal devices, and which wirelessly connect the customer station with a base station have been developed and implemented.

The wireless communication capability such a subscriber wireless access system provides between the base station and the customer stations makes it possible to interconnect the communications network on the base station side and the communication terminal devices on the customer station side. Moreover, by allowing the base station to function as a bridge, such a system can provide an interconnection among the communication terminal devices of multiple customer stations accommodated by one and the same base station.

The use of a subscriber wireless access system therefore makes it possible, by simply setting up a base station and a customer station, to connect communication terminal devices, or their LANs, to a communications network without the need to install communication lines.

The use of a subscriber wireless access system also makes it possible to group a number of customer stations which are served by the same base station. For example, a subscriber's LANs can be divided up and each connected to a different customer station within the same group. A company (subscriber) with several buildings can connect the LANs that are installed in the individual buildings to different customer stations within the same group and thus enjoy such benefits as company wide LAN integration.

The rising importance of and need for telecommunications are producing a strong demand for the constant interconnection between communication terminal devices. The demand for a constant connection is also strong from users of subscriber wireless systems, who are seeking to use an ATM network and other virtual dedicated line network services which are offered by communications companies so as to maintain a constant connection among the communication terminal devices under their customer stations.

The subscriber wireless access system, which uses a virtual dedicated line network so as to interconnect different base stations, enables the communication terminal devices which are served by the different customer stations wirelessly connected to these different base stations to maintain a constant connection via the virtual dedicated line network.

In the subscriber wireless access system, however, since the base stations accommodate multiple customer stations belonging to different entities, the mere connection of base stations by a virtual dedicated line network results in a constant connection between customer stations that should not be constantly connected (i.e., between their communication terminal devices).

Consider, for example, the case where company A's head office in Tokyo has a customer station which is served by a base station in Tokyo and its branch office in Osaka has a customer station which is served by a base station in Osaka. If the LAN of the Tokyo head office customer station and the LAN of the Osaka branch office customer station are constantly connected, the LAN of company B's customer station, which is accommodated by the same base station as company A's Tokyo head office customer station, will also be constantly connected with company A's Osaka branch office. This is undesirable from a secrecy protection stand point.

The present invention was accomplished in light of these circumstances and has as an object to provide a subscriber wireless access system which enables a trouble-free constant connection through a virtual dedicated line network.

Other objects of the present invention will become more apparent from the following description.

SUMMARY OF THE INVENTION

The present invention provides a subscriber wireless access system which is equipped with customer stations that are wirelessly connected to base stations and accommodating communication terminal devices in the customer stations directly or through a network such as a LAN. The subscriber wireless access system according to the present invention comprises: at least one exchange for connecting base stations with a virtual dedicated line network for enabling customer stations which are wirelessly connected to different base stations to be interconnected via a virtual dedicated line network, where the at least one exchange includes a table correlating identification information that is assigned to the customer stations with virtual dedicated line network connection information allocated for connecting the customer stations; means responsive to the receipts of data from a customer station via a subordinate base station for, with reference to the table, sending the data through the virtual dedicated line network to another base station, and means responsive to the receipt of data through the virtual dedicated line network for, with reference to the table, converting the data to customer station identification information of a customer station and sending the data to a subordinate base station.

For example, in a specific configuration, the exchange stores in the table station-specific IDs (CPE-IDs: consumer premises equipment identifiers) which are assigned to the individual customer stations or tags (VLAN-Tags: virtual local area network tags) for customer station identification which are set in Ethernet frames in conformity with IEEE 802.1Q in association with virtual dedicated line network connection information (VPI/VCI: virtual path identifier/virtual channel identifier), response to the receipt of data form a customer station via a subordinate base station by, with reference to the table, converting identification information of the sending customer station that is attached to the data (CPE-ID or VLAN-Tag) to virtual dedicated line network connection information (VPI/VCI) and sending the data to another base station through the virtual dedicated line network, and responds to the receipt of data through the virtual dedicated line network by, with reference to the table, converting the virtual dedicated line network connection information (VPI/VCI) of the data to customer station identification information (CPI-ID or VLAN-Tag) and sending the converted data to a subordinate base station (i.e., a customer station).

A constant connection between customer stations (namely, their subordinate communication terminal devices) can therefore be realized. Moreover, since the subscriber wireless access system can establish a constant connection between specific subscribers, the distribution of information from a pay TV station to subscribers and other similar services is made possible.

In the subscriber wireless access system according to the present invention, an exchange is preferably connected to each of the base stations or incorporated in each of the base stations so as to control the communications between the base station and the virtual dedicated line network. Preferably, the tables of the exchanges store identical virtual dedicated line network connection information (VPI/VCI) for customer stations which are connected through the virtual dedicated line network.

For instance, the connection information which is associated with the identification information of customer station A stored in one exchange table and the connection information which is associated with the identification information of a customer B stored in another exchange connected to the same virtual dedicated line network are identical. Thus, for example, the customer station of a company's Tokyo head office and the customer station of the same company's Osaka branch office can maintain a constant connection in a closed environment, and as a result, the communication terminal devices which are served by the two customer stations can stay in constant connection while maintaining communication privacy.

In the subscriber wireless access system of the present invention, each customer station is preferably assigned station-specific identification information for identifying the individual customer station and group identification information for identifying the customer station as a member of a customer station group. Further, each base station has tables correlating the station-specific identifier information and the group identification information and stores the same group identification information (VLAN-Tag) for customer stations belonging to the same group.

For example, in a specific configuration, the station-specific identifier information of each customer station is a CPE-ID and the group identification information is a VLAN-Tag, the base stations correlate and manage the CPE-IDs and the VLAN-Tags by using the tables, and the same VLAN-Tag is stored for customer stations belonging to the same group. For instance, in a case where five customer stations whose CPE-IDs are A to E are installed under a certain base station and the two customer stations whose CPE-IDs are B and D are to be grouped, these two customer stations are managed by assigning them the same VLAN-Tag in the table.

Therefore, since the group identification information (VLAN-Tags) of the base stations and the customer stations are included in the wireless frames and since the base stations conduct communications control by using the VLAN-Tags, different customer stations under the base stations can be formed into closed groups, and the communication terminal devices under each group of customers stations can be virtually connected as if connected to the same LAN.

Further, if the VLAN-Tags constituting the identification information of the customer stations are managed by associating them with the virtual dedicated line network connection information (VPI/VCI) which is also in the exchange table, customer station groups under different base stations can also be constantly connected through the virtual dedicated line network.

The subscriber wireless access system can be configured as a single network management protocol (SNMP) system, the tables of the base stations can be configured as management information bases (MIBs), and the group identification information (VLAN-Tags) can be written to the management information bases by using information that is sent from a management unit (SNMP manager) which is connected via the virtual dedicated line network.

This makes it possible, for example, for an administration (operation) center that has received a subscriber request for the formation of a group to establish the desired group by remote operations with respect to the base stations. Groups of customer stations which are constantly connected through the virtual dedicated line network can therefore be easily established without the need for workers to visit and conduct an on-site setup at the individual base stations.

In the subscriber wireless access system according to the present invention, the group identification information (VLAN-Tags) which are assigned to the customer stations are preferably included in the wireless frames of the base stations and the customer stations and, therefore, as explained above, the communication terminal devices under multiple customer stations can be virtually connected as if connected to the same LAN. In addition, the subordinate customer stations can be notified of the group identification information (VLAN-Tags) that is written in the base station tables.

The present invention also provides an exchanges for connecting base stations to a virtual dedicated line network so as to enable customer stations which are wirelessly connected with different base stations to be interconnected via the virtual dedicated line network. This exchange according to the present invention comprises: a table correlating identification information which is assigned to the customer stations (VLAN-tags, CPE-IDs or the like) with virtual dedicated line network connections information that is allocated for connecting the customer stations (VPI/VCI or the like); means for, with reference to the table, sending data that is received from a customer station via a subordinate base station through the virtual dedicated line network to another base station; and means for, with reference to the table, converting data that is received through the virtual dedicated line network to customer station identification information and sending the converted data to a subordinate base station.

The present invention also provides a base station which is capable of connecting to a virtual dedicated line network for enabling customer stations which are wirelessly connected with different base stations to be interconnected via the virtual dedicated line network. The base station according to the present invention comprises: a table correlating identification information which is assigned to the customer stations (VLAN-tags, CPE-IDs or the like) with virtual dedicated line network connection information that is allocated for connecting the customer stations (VPI/VCI or the like); means for, with reference to the table, sending data that is received from a customer station via a subordinate base station through the virtual dedicated line network to another base station; and means for, with reference to the table, converting data that is received through the virtual dedicated line network to customer station identification information and sending the converted data to a subordinate base station.

DETAILED DESCRIPTION OF THE INVENTION

The present invention will now be explained in detail with respect to the case where the communication protocol between the base station and the customer stations utilizes Ethernet frames tagged with VLAN-Tags conforming with IEEE 802.1Q.

Figure 1:
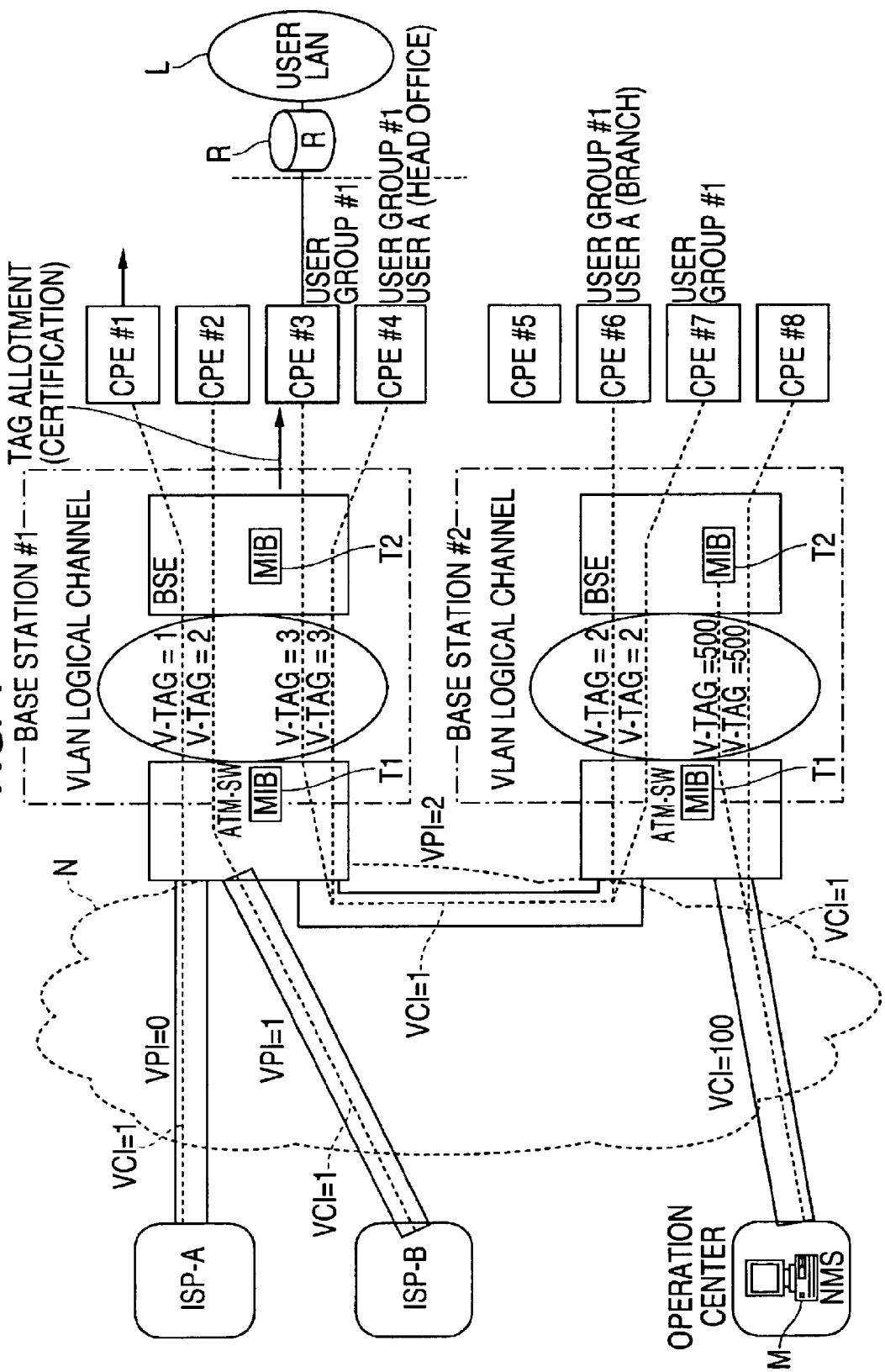
FIG. 1 is a block diagram of a subscriber wireless access system according to an embodiment of the present invention.
Figure 2:
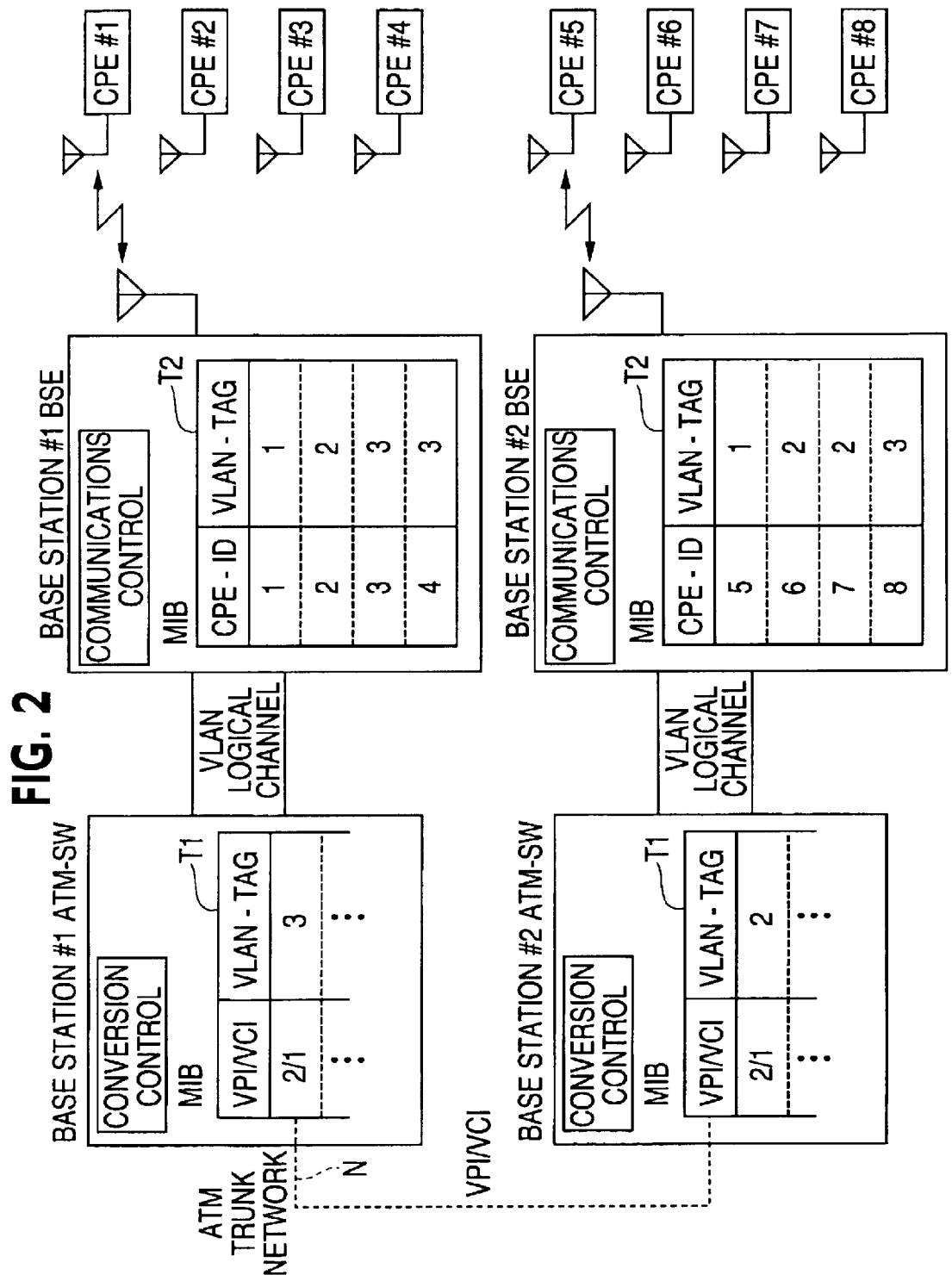
FIG. 2 is a conceptual diagram for explaining the contents of tables of a subscriber wireless access system according to an embodiment of the present invention.

FIG. 1 is a block diagram of the subscriber wireless access system according to the present embodiment. FIG. 2 is a diagram showing the contents of correlation tables of the exchanges and base stations.

As shown in FIG. 1, multiple base stations are connected by SNMP via an ATM trunk network N, which is a virtual dedicated line network. Each base station accommodates a number of customer stations which are wirelessly connected by Ethernet frames. Each customer station is connected through a router R with a local area network L accommodating a large number of communication terminal devices (PCs; not shown).

The ATM trunk network N is connected with various servers of Internet service providers (ISP-A, ISP-B) and the like. The ATM trunk network N is also connected with a SNMP manager server M which is installed at an operation center that manages the subscriber wireless access system according to the present invention.

In the ensuring explanation, the two base stations are designated base stations #1 and base station #2, the four customer stations which are accommodated by the base station #1 are designated CPE#1–CPE#4, and the four customer stations which are accommodated by the base station #2 are designated CPE#5–CPE#8.

In this embodiment, an exchange is incorporated in the ATM trunk network interface unit of each base station. The exchange section of each base station, which mainly handles communications control of the virtual dedicated line network, is designated ATM-SW, and the base station section of each base station, which mainly handles wireless communications control of the customer stations, is designated BSE.

In each of the base station #1 and the base station #2, the ATM-SW is provided with a MIB table T1, and the BSE is provided with a MIB table T2. The contents of the MIB tables can be defined by the SNMP server through the ATM trunk network N.

In this embodiment, the MIB tables T1 and T2 are defined to store contents like those shown in FIG. 2.

In the table T2 which is provided in the BSE of the base station #1, the station-specific identifier CPE-IDs of the of the subordinate CPEs #1–#4 are entered in association with the group identifiers VLAN-Tag of the same CPEs. VLAN-Tag: 1 is associated with CPE#1 assigned CPE-ID: 1, VLAN-Tag: 2 is associated with CPE#2 assigned CPE: 2, and VLAN-Tag: 3 is associated with both CPE#3 assigned CPE: 3 and CPE#4 assigned CPE: 4. In other words, the CPE#3 and CPE#4 are defined as belonging to the same group.

In the table T2 which is provided in the BSE of base station #2, the station-specific identifier CPE-IDs of the subordinate CPEs #5–#8 are written in association with the group identifiers VLAN-Tag of the same CPEs. VLAN-Tag: 1 is associated with CPE#5 assigned CPE-ID:5, VLAN-Tag: 2 is associated with both CPE#6 assigned CPE: 6 and CPE#7 assigned CPE: 7, and VLAN-Tag: 3 is associated with CPE#8 assigned CPE: 8. In other words, the CPE#6 and CPE#7 are defined as belonging to the same group.

In the embodiment shown in FIG. 1, the CPE#3 and CPE#4 are two customer stations at user A's Tokyo head office, and the CPE#6 and CPE#7 are customer stations of the same user A's Nagoya branch office. This embodiment conducts communications control between user A's Tokyo and Nagoya customer stations, and conducts communications control with the Tokyo and Nagoya customer stations, which are kept in constant connection.

Figure 3:
FIG. 3 is a conceptual diagram for explaining an Ethernet frame according to an embodiment of the present invention.

The BSEs of the base stations #1 and #2 are provided with communications control capability for controlling wireless communications with the customer stations using the Ethernet frame shown in FIG. 3. The BSEs conduct communications control by using the MAC address which is included in the frame as the address of a specific communication terminal device, control communications within customer station groups according to the VLAN-Tag that is included in the frame, and control the handling of transmission data that is included in the IP frame.

The ATM-SW and BSE of the base station #1 are connected by VLAN-Tag logical channels. In the table T1 provided in the ATM-SW of the base station #1, the VLAN-Tags are entered in association with information VPI/VCI specifying a connection with a path of the ATM trunk network N. For example, VPI/VCI: 2/1 is associated with VLAN-Tag: 3. In other words, communication by VLAN-Tag: 3 is conducted in a constantly connected state through the connection which is specified by VPI/VCI: 2/1 of the ATM trunk network N.

The ATM-SW and BSE of the base station #2 are connected by VLAN-Tag logical channels. In the table T1 provided in the ATM-SW of the base station #2, the VLAN-Tags are entered in association with information VPI/VCI specifying a connection with a path of the ATM trunk network N. For example, VPI/VCI: 2/1 is associated with VLAN-Tag: 2. In other words, communication by VLAN-Tag: 2 is conducted in a constantly connected state through the connection which is specified by VPI/VCI: 2/1 of the ATM trunk network N.

The ATM-SW of each of the base stations #1 and #2 is provided with conversion/control capability for use the contents of its table T1 to convert VPI/CVI to VLAN-Tag and thereby pass data that is received from the ATM trunk network N through the VLAN logical channels to the BSE, and also to use the content of its table T1 to convert VLAN-Tag to VPI/VCI and thereby send the data that is received from the BSE through the VLAN logical channel out on the ATM trunk network N.

Owing to the conversion/control capability of ATM-SW, therefore the group on the base station #1 side including CPE#3 and CPE#4 assigned VLAN-Tag: 3 and the group on the base station #2 side including CPE#6 and CPE#7 assigned VLAN-Tag: 2 are constantly connected through the connection of the ATM trunk network N which is specified by VPI/VCI: 2/1. The customer stations installed at user A's Tokyo head office (i.e., the communication terminal devices under them) and the customer stations installed at user A's Nagoya branch office (i.e., the communication terminal devices under them) are constantly connected.

In the subscriber wireless access system of the foregoing configuration, if for example, a subscriber (user A) wants to group the CPE#6 and CPE#7 and sends a request to this effect to the operating center, the operating center SNMP manager M rewrites the MIB Table 2 that is provided in the BSE of the base station #2 in line with the sent request. Specifically, the SNMP manager server M connects with the base station #2 through an ATM trunk network N setting connection VPI/VCI: 1/1, uses a setting VLAN-Tag: 500 to access the BSE of the base station #2, and sets the same VLAN-Tag: 2 for the CPE#6 and CPE#7 in the MIB table 2.

Since, as shown in FIG. 3, the wireless frames of the BSE and CPE include VLAN-Tags, the CPE is notified of the VLAN-Tag that is set in the MIB table 2 of the BSE in this way by wireless communication between the BSE and the CPE.

If, for example, a subscriber (user A) wants to establish a constant connection between the group which is composed of the CPE#3 and CPE#4 of the base station #1, which have already been grouped by setting the same VLAN-Tag: 3 and a customer station group which is composed of the CPE#6 and CPE#7 of the base station #2, and sends a request to this effect to the operating center, the operating center SNMP manager server M rewrites the MID table 1 that is provided in the ATM-SW of the base station #1 in line with the sent request.

Specifically, the SNMP manager server M connects with the base station #1 via the setting connection VPI/VCI: 1/1 of the ATM trunk network N, accesses ATM-SW, and, in the MIB table T1, sets in association with VLA-Tag: 3 of the CPE#3 and CPE#4 of the base station #1 the same VPI/VCI: 2/1 as set for the CPE#6 and CPE#7 of the base station #2.

The present invention thus enables the setting of CPE groups and the establishment of a constant connection between CPEs through the ATM trunk network N by a remote operation from the SNMP manager server M.

When the foregoing table setting is in effect and data are, for instance, transmitted from a communication terminal device under the CPE#3 to a communication terminal device under the CPE#4, the VLAN-Tag that is included in the transmission frame which is sent from the CPE#3 to the BSE of the base station #1 transfers the data to the CPE#4 which is associated with the same VLAN-Tag.

Even under the same base station, therefore, communication terminal devices that are accommodated under different customer stations (CPEs) can communicate with each other just as if they were connected by the same LAN.

When data is sent from a communication terminal device under the CPE#3 to a communication terminal device under a CPE of the same user that is accommodated by another base station (base station #2), the data is handed over to the ATM-SW in the base station #1 and, based on the MIB table T1, is sent to the base station #2 through the constant VPI/VCI: 2/1 connection which is established in the ATM trunk network N. The base station #2, based on the VPI/VCI: 2 and its own MIB table 1, converts the received data to the associated VLAN-Tag: 2 and sends the converted data to the CPE#6 and CPE#7 which are accommodated by the base station #2.

Customer stations (communication terminal devices) which are accommodated by different base stations can therefore be constantly connected based on settings.

As explained above, the present invention provides a subscriber wireless access system that enables a trouble-free constant connection between customer stations which are accommodated by different base stations through a virtual dedicated line network without difficulty and enables the simple formation of customers station groups. In addition, the present invention enables the operations for making and modifying the settings for establishing such constant connections and customer station groups to be centralized and performed remotely.

What is claimed is:

1. A subscriber wireless access system equipped with customer stations which are wirelessly connected to base stations and for accommodating communication terminal devices in the customers stations, said subscribers wireless access system comprising:

exchanges for connecting the base stations with a virtual dedicated line network so as to enable customer stations which are wirelessly connected to different base stations to be interconnected via a virtual dedicated line network;

wherein each of said exchanges include:
a table for correlating identification information assigned to the customer stations with virtual dedicated line network connection information allocated for connecting the customer stations;
means for receiving data from a customer station via a subordinate base station, and, with reference to the table, sending the received data through the virtual dedicated line network to another base station; and
means for receiving data through the virtual dedicated line network, and, with reference to the table, converting the received data to customer station identification information of a customer station and sending the converted data to a subordinate base station, wherein at least one of said exchanges is provided in each of the base stations;

wherein said table of each of said exchanges contains identical virtual dedicated line network connection information for the customer stations connected through the virtual dedicated line network;

wherein each customer station is assigned station-specific identification information for identifying the individual customer station and group identification information for identifying the individual customer station as a member of a customer station group, and each customer station group is assigned unique group identification information;

wherein each base station has a first table for correlating the virtual dedicated line network connection information with the group identification information of each customer station group and a second table for correlating the station-specific identifier information and the group identification information of each customer station group, and said first and second tables of each of the base stations contain the same group identification information for customer stations belonging to the same customer station group; and wherein said first and second tables of the base stations are management information bases and, by utilizing a simple network management protocol system, the group identification information is written to the management information bases by using information sent from a management unit connected via the virtual dedicated line network.

2. A subscriber wireless access system according to claim 1, wherein when different customer stations under to the base stations are formed into closed customer station groups, communication terminal devices under each customer station group are virtually connected to each other.

3. A subscriber wireless access system according to claim 1, wherein the group identification information assigned to the customer stations are included in wireless frames of the base stations and the customer stations.

4. A subscriber wireless access system equipped with customer stations which are wirelessly connected to base stations and for accommodating communication terminal devices in the customer stations, said subscriber wireless access system comprising:

at least one exchange for connecting the base stations with a virtual dedicated line network so as to enable customer stations which are wirelessly connected to different base stations to be interconnected via a virtual dedicated line network;

wherein said at least one exchange includes:
 a table for correlating identification information assigned to the customer stations with virtual dedicated line network connection information allocated for connecting the customer stations;
 means for receiving data from a customer station via a subordinate base station, and with reference to said table, sending the received data through the virtual dedicated line network to another base station; and
 means for receiving data through the virtual dedicated line network, and with reference to said table, converting the received data to customer station identification information of a customer station and sending the converted data to a subordinate base station, wherein each customer station is assigned station-specific identification information for identifying the individual customer station and group identification information for identifying the individual customer station as a member of a customer station group, and each customer station group is assigned unique group identification information; and wherein each base station has a first table for correlating the virtual dedicated line network connection information with the group identification information of each customer station group and a second table for correlating the station-specific identifier information and the group identification information of each customer station group, and said first and second tables of each of the base stations contain the same group identification information for customer stations belonging to the same customer station group; and wherein said first and second tables of each of the base stations are management information bases and, by utilizing a simple network management protocol system, the group identification information is written to the management information bases by using information sent from a management unit connected via the virtual dedicated line network.

5. A subscriber wireless access system according to claim 4, wherein when different customer stations under to the base stations are formed into closed customer station groups, communication terminal devices under each customer station group are virtually connected to each other.

6. A subscriber wireless access system according to claim 4, wherein the group identification information assigned to the customer stations are included in wireless frames of the base stations and the customer stations.

7. A subscriber wireless access system equipped with customer stations which are wirelessly connected to base stations and for accommodating communication terminal devices in the customer stations, said subscriber wireless access system comprising:

exchanges for connecting the base stations with a virtual dedicated line network so as to enable customer stations which are wirelessly connected to different base stations to be interconnected via a virtual dedicated line network;

wherein each of said exchanges includes:
 a table for correlating identification information assigned to the customer stations with virtual dedicated line network connection information allocated for connecting the customer stations;
 means for receiving data from a customer station via a subordinate base station, and with reference to the table, sending the received data through the virtual dedicated line network to another base station; and
 means for receiving data through the virtual dedicated line network, and, with reference to the table, converting the received data to customer station identification information of a customer station and sending the converted data to a subordinate base station;

wherein an exchange is provided in each of the base stations;

wherein said table of each of said exchanges contains identical virtual dedicated line network connection information for the customer stations connected through the virtual dedicated line network;

wherein each customer station is assigned station-specific identification information for identifying the individual customer station and group identification information for identifying the individual customer station as a member of a customer station group, and each customer station group is assigned unique group identification information; and wherein each base station has a first table for correlating the virtual dedicated line network connection information with the group identification information of each customer station group and a second table for correlating the station-specific identifier information and the group identification information of each customer station group, and said first and second tables of each of the base station contain the same group identification information for customer stations belonging to the same customer station group.

8. A subscriber wireless access system according to claim 7, wherein when different customer stations under to the base stations are formed into closed customer station groups, communication terminal devices under each customer station group are virtually connected to each other.

9. A subscriber wireless access system according to claim 7, wherein the group identification information assigned to the customer stations are included in wireless frames of the base stations and the customer stations.

10. A subscriber wireless access system equipped with customer stations which are wirelessly connected to base stations and for accommodating communication terminal devices in the customer stations, said subscriber wireless access system comprising:

at least one exchange for connecting the base stations with a virtual dedicated line network so as to enable customer stations which are wirelessly connected to different base stations to be interconnected via virtual dedicated line network;

wherein said at least one exchange includes:
a table for correlating identification information assigned to the customer stations with virtual dedicated line network connection information allocated for connecting the customer stations;
means for receiving data from a customer station via a subordinate base station and, with reference to said table, sending the received data through the virtual dedicated line network to another base station; and
means for receiving data through the virtual dedicated line network, and, with reference to said table, converting the received data to customer station identification information of a customer station and sending the converted data to a subordinate base station;

wherein each customer station is assigned station-specific identification information for identifying the individual customer station and group identification information for identifying the individual customer station as a member of a customer station group, and each customer station group is assigned unique group identification information; and wherein each base station has a first table for correlating the virtual dedicated line network connection information with the group identification information of each customer station group and a second table for correlating the station-specific identifier information and the group identification information of each customer station group, and said first and second tables of each of the base station contain the same group identification information for customer stations belonging to the same customer station group.

11. A subscriber wireless access system according to claim 10, wherein when different customer stations subordinate to the base stations are formed into closed customer station groups, communication terminal devices under each customer station group are virtually connected to each other.

12. A subscriber wireless access system according to claim 10, wherein the group identification information assigned to the customer stations are included in wireless frames of the base stations and the customer stations.

13. A base station for connecting to a virtual dedicated line network so as to enable customer stations which are wirelessly connected with different base stations to be interconnected via the virtual dedicated line network, wherein each customer station is assigned station-specific identification information for identifying the individual customer station and group identification information for identifying the individual customer station as a member of a customer station group, and each customer station group is assigned unique group identification information; and wherein said base station comprises:
a first table for correlating virtual dedicated line network connection information allocated for connecting the customer stations with the group identification information of each customer station group;
a second table for correlating the station-specific identifier information and the group identification information of each customer station group,
wherein said first and second tables of said base station contain the same group identification information for customer stations belonging to the same customer station group, and said first and second tables are thereby operable to correlate the station-specific identification information assigned to the customer stations with the virtual dedicated line network connection information;
means for receiving data from a customer station via a subordinate base station and, with reference to said tables, sending the received data through the virtual dedicated line network to another base station; and
means for, with reference to said tables, receiving data through the virtual dedicated line network, converting the received data to customer station identification information and sending the converted data to a subordinate base station.

14. A base station according to claim 13, wherein when different customer stations under to said base stations are formed into closed customer station groups, communication terminal devices under each customer station group are virtually connected to each other.

15. An exchange for connecting base stations to a virtual dedicated line network so as to enable customer stations which are wirelessly connected with different base stations to be interconnected via the virtual dedicated line network, said exchange comprising:
a table for correlating identification information assigned to the customer stations with virtual dedicated line network connection information allocated for connecting the customer stations;
means for, with reference to the table, sending data received from a customer station via a subordinate base station through the virtual dedicated line network to another base station; and
means for, with reference to the table, converting data received through the virtual dedicated line network to customer station identification information and sending the converted data to a subordinate base station;

wherein each customer station is assigned station-specific identification information for identifying the individual customer station and group identification information for identifying the individual customer station as a member of a customer station group, and each customer station group is assigned unique group identification information; and wherein each base station has a first table for correlating the virtual dedicated line network connection information with the group identification information of each customer station group and a second table for correlating the station-specific identifier information and the group identification information of each customer station group, and said first and second tables of each the base stations contain the same group identification information for customer stations belonging to the same customer station group.

16. An exchange according to claim 15, wherein when different customer stations under to the base stations are formed into closed customer station groups, communication terminal devices under each customer station group are virtually connected to each other.

* * * * *